United States Patent [19]

Roelle

[11] Patent Number: 4,949,591
[45] Date of Patent: Aug. 21, 1990

[54] LEVER CONTROL

[75] Inventor: David R. Roelle, Conroe, Tex.

[73] Assignee: Capro, Inc., Willis, Tex.

[21] Appl. No.: 390,526

[22] Filed: Aug. 7, 1989

Related U.S. Application Data

[63] Continuation-in-part of Ser. No. 182,245, Apr. 15, 1988, abandoned.

[51] Int. Cl.$^5$ .............................................. G05G 5/06
[52] U.S. Cl. ........................................ 74/531; 74/519; 74/527; 74/528
[58] Field of Search .................. 74/527, 531, 519, 528, 74/526, 473 R, 502.2, 488, 489

[56] References Cited

U.S. PATENT DOCUMENTS

| | | | |
|---|---|---|---|
| 2,373,225 | 4/1945 | Clickner | 74/531 |
| 2,373,739 | 4/1945 | Batterson | 74/531 X |
| 2,509,058 | 5/1950 | Haury | 74/531 X |
| 2,509,271 | 5/1950 | Jeffery | 74/531 X |
| 2,542,423 | 2/1951 | Metzger | 74/502.2 |
| 2,552,726 | 5/1951 | Larson | 74/531 |
| 2,587,875 | 3/1952 | Moore et al. | 74/531 X |
| 2,826,093 | 3/1958 | Draper | 74/531 X |
| 3,008,346 | 11/1961 | Kratville | 74/531 |
| 3,086,407 | 4/1963 | Reece | 74/528 X |
| 3,400,605 | 9/1968 | Hood | 74/531 X |
| 3,418,867 | 12/1968 | Maeda | 74/502.2 X |
| 3,556,270 | 1/1971 | Comment | 74/531 X |
| 3,567,250 | 3/1971 | Wolf | 74/502.2 X |
| 3,877,217 | 4/1975 | Hochstrate | 74/531 X |
| 3,921,955 | 11/1975 | Haddad | 74/531 X |
| 3,987,687 | 10/1976 | Bland et al. | 74/531 |
| 4,180,716 | 12/1979 | Suzuki | 74/531 X |
| 4,252,032 | 2/1981 | Baba | 74/531 |

FOREIGN PATENT DOCUMENTS

| | | | |
|---|---|---|---|
| 536307 | 1/1957 | Canada | 74/531 |
| 0118115 | 9/1980 | Japan | 74/531 |
| 615879 | 7/1978 | U.S.S.R. | 74/527 |
| 192221 | 2/1923 | United Kingdom | 74/531 |

OTHER PUBLICATIONS

Wescon Products Company Catalog. (undated), 25633 South West Street/P.O. Box 1202, Wichita, Kansas 67201/(316)942-7901, pp. 3-1 through 3-15.

Primary Examiner—Vinh T. Luong

[57] ABSTRACT

An improved throttle control which includes a metal throttle lever, a metal bracket, a plastic detent plate and the lever being pivotally mounted to the bracket with the detent plate therebetween and a spring biasing the lever toward the detent plate. The detent plate includes an annular ridge facing the lever and immediately surrounding the mounting means and an arcuate ridge facing the lever and spaced radially outward from said annular ridge. The arcuate ridge includes at least one recess which coacts with a detent on the lever to provide an easily detected preset throttle position. The detent on the lever rides on the arcuate ridge and the force necessary for lever movement is determined by the friction force created between the lever detent and the detent plate arcuate ridge. The lever also includes an arm which engages a throttle cable and the bracket receives and secures the end of the throttle cable sheath.

13 Claims, 5 Drawing Sheets

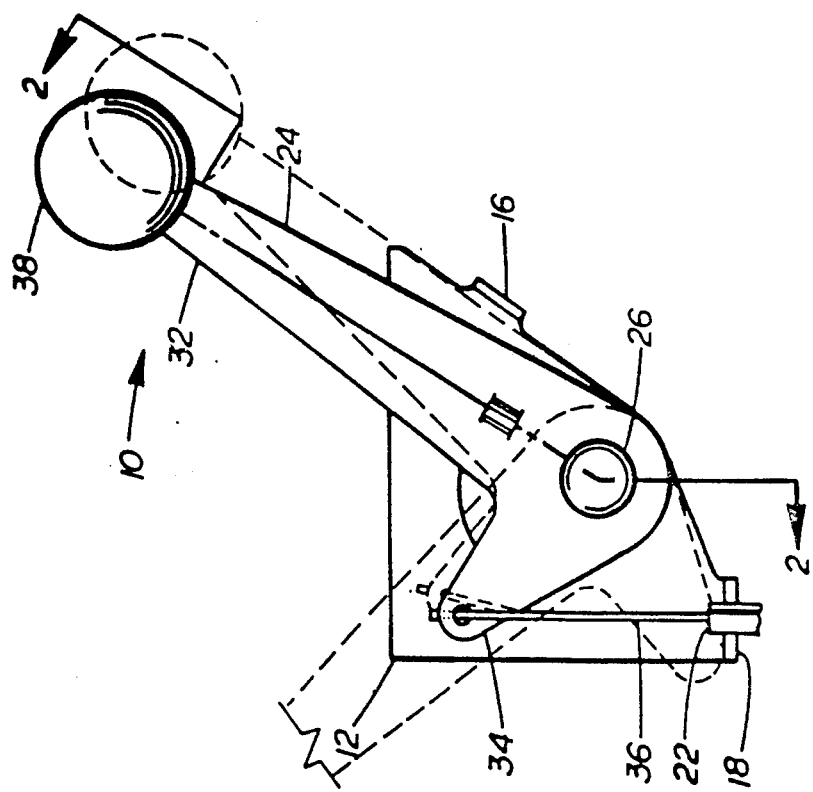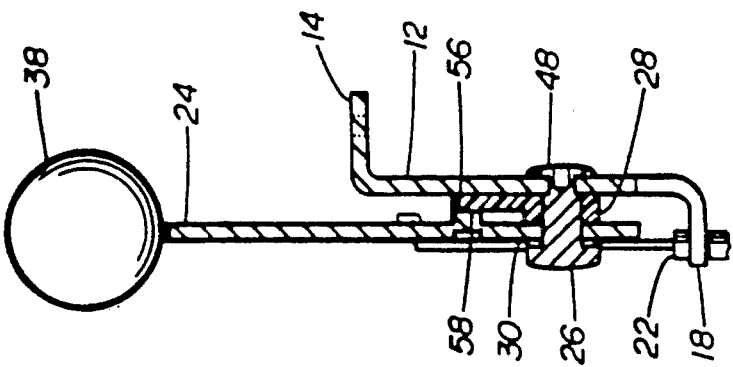

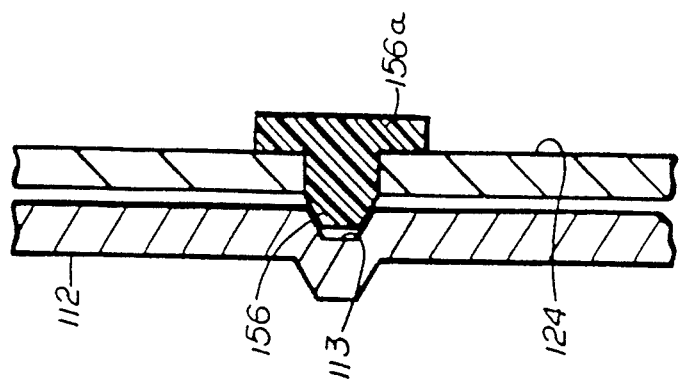
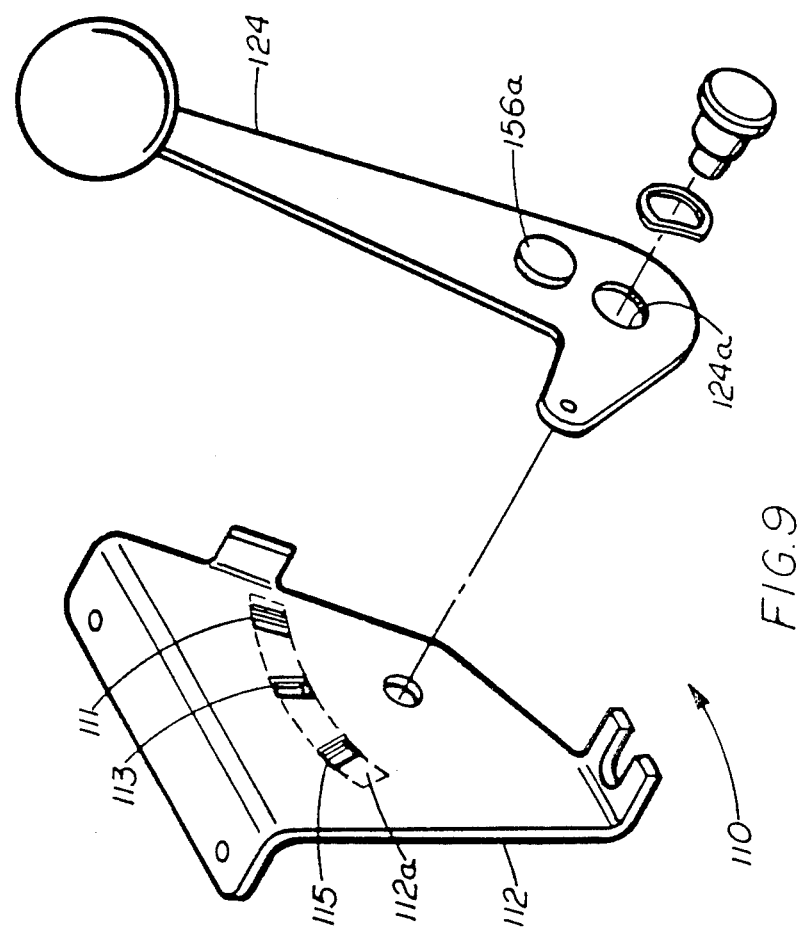

LEVER CONTROL

CROSS REFERENCE TO RELATED APPLICATIONS

This application is a continuation-in-part application of my prior co-pending application Ser. No. 07/182,245 filed Apr. 15, 1988 for Lever Control, now abandoned.

BACKGROUND

The present invention relates to an improved lever type control, such as a throttle lever control, for an internal combustion engine, such as the type of engine used in a riding lawn mower, to other engines which utilize a lever type of throttle control and to other units, such as a transmission control. The improved throttle control includes at least one throttle position which is preferred to be preset, which is easily detected in moving the throttle and which remains in the preferred position without throttle adjustments.

Prior control levers of the type considered herein have included many different configurations in an attempt to solve the many problems which are encountered but none of the prior art devices have included the combination of some type of mounting bracket or housing, a control lever, means for pivotally mounting the lever to the bracket or housing, means for connecting the lever to a control cable and the mounting means includes means to control the friction incident to the moving the lever between its positions.

One prior throttle control has introduced a washer around the pivotal mounting between the metal lever and the metal mounting bracket which was made of a material which is similar to a brake lining in an attempt to maintain a uniform friction between the lever and the mounting bracket. The pivotal connection also includes a rivet which extends through the lever, the washer and the mounting bracket and has a plurality of wave washers between the rivet head and the lever. The rivet is believed to be a shoulder rivet which extends through the wave washers, the lever and the washer and its shoulder abuts the surface of the mounting bracket and has its reduced end extending through the mounting bracket and formed against the opposite side of the mounting bracket. The mounting bracket includes two stops which are engaged by the lever at the respective ends of its travel and an opening which engages the end of the cable sheath. The lever includes an arm which engages the cable. The use of the friction material in this prior control did accomplish a unit in which the friction was controlled until it is exposed to an operator or to the environment. The application of a lubricant by the operator or the accumulation of grease and oil on the unit can drastically alter the amount of friction developed to resist the operation of the throttle. It is generally preferred that such friction cause a minimum of a 5 pound force and a maximum of a 15 pound force to move the lever.

Another prior throttle control utilized a similar metal lever and metal mounting bracket and a hard plastic material and a wave washer in the pivotal mounting and two stops on the mounting bracket at the extremes of the movement of the lever.

Another prior throttle control includes a metal mounting bracket pivotally mounting a metal throttle lever with openings in the bracket and a projection on the lever to ride on the surface of the bracket and engage within the openings as the throttle reaches such desired positions. The pivotal mounting includes a rivet with a wave washer biasing the lever against the bracket. This throttle relies entirely on the friction between the lever projection and the bracket. In many applications this friction may change drastically. For example, the accumulation of grease or oil and intentional lubrication of the surfaces can greatly reduce the friction and exposure to weather which causes oxidation of the surfaces of the bracket and lever can greatly increase the friction. The provision of the two selected positions which are other than in the throttle lever extreme positions is desirable.

Another prior throttle control utilizes the metal bracket and metal lever pivotally connected by a rivet with a plastic material between the lever and bracket and projections on the bracket and the lever which are adapted to coact to provide a stop in the lever movement. This control also includes a plastic washer between the rivet head and the lever and detents in the bracket in the area of the plastic material which appear to limit the movement of the plastic material between the bracket and the lever.

Another prior throttle control includes a plastic housing with a metal lever which is pivotally mounted within the housing and a serrated track which is engaged by the lever during its active motion to provide the desired friction. The movement of the lever past the ends of the track requires additional force but allows the extended movement of the lever in a friction free movement.

Another prior throttle control included a metal bracket and a metal lever with pivotal mounting of the lever and a friction washer between the lever and the bracket and another friction washer between the lever and a fixed metal washer with the fixed metal washer being secured to the bracket to prevent its rotation.

Additionally it is understood that washers have been used with throttle levers to control the force of movement of the lever wherein the washers have included facing serrated surfaces which require a certain amount of force to create the pivotal lever movement.

SUMMARY

The present invention relates to an improved control which in its preferred form includes a metal throttle lever, a metal bracket, a plastic detent plate and means mounting the lever to the bracket with the detent plate therebetween and with means biasing the lever toward the detent plate. The detent plate includes an annular ridge facing the lever and immediately surrounding the mounting means and an arcuate ridge facing the lever and spaced radially outward from said annular ridge. The arcuate ridge includes at least one recess which coacts with a detent projecting from the lever to provide an easily detected preset control position. The detent on the lever rides on the arcuate ridge and the force necessary for lever movement is determined by the friction force created between the lever detent and the detent plate arcuate ridge. The lever also includes an arm with means for engaging a control cable and the bracket includes means for receiving and securing the end of the throttle cable sheath.

An object of the present invention is to provide an improved lever control for a mechanism, such as an internal combustion engine throttle which has a preselected amount of force necessary for the movement of the throttle which does not vary substantially.

Another object is to provide an improved lever control in which the force necessary for the lever movement may be readily preselected.

A further object is to provide an improved lever control having a preselected force for the movement of the lever and at least one preselected stop position which is at an intermediate position in the travel of the lever.

Still another object is to provide an improved lever control having a preselected force for lever movement which is not influenced by the environment or the application of lubricants by the operator.

BRIEF DESCRIPTION OF THE DRAWINGS

These and other objects and advantages are hereinafter set forth and explained with reference to the drawings wherein:

FIG. 1 is an elevation view of the improved throttle control of the present invention and shows the connection of the throttle cable and cable sheath thereto and the positions of full choke and stop in broken lines.

FIG. 2 is a sectional view of the improved control taken along line 2—2 in FIG. 1.

FIG. 9 is an exploded view of the present invention similar to FIG. 3 but showing the modified form which utilizes the space on the bracket surrounding the mounting opening against the detent on the control lever engages in its movement.

FIG. 10 is a sectional view through the assembled lever and bracket shown in FIG. 9 to illustrate the plastic insert on the lever.

DESCRIPTION OF THE PREFERRED EMBODIMENTS

Figure 3:
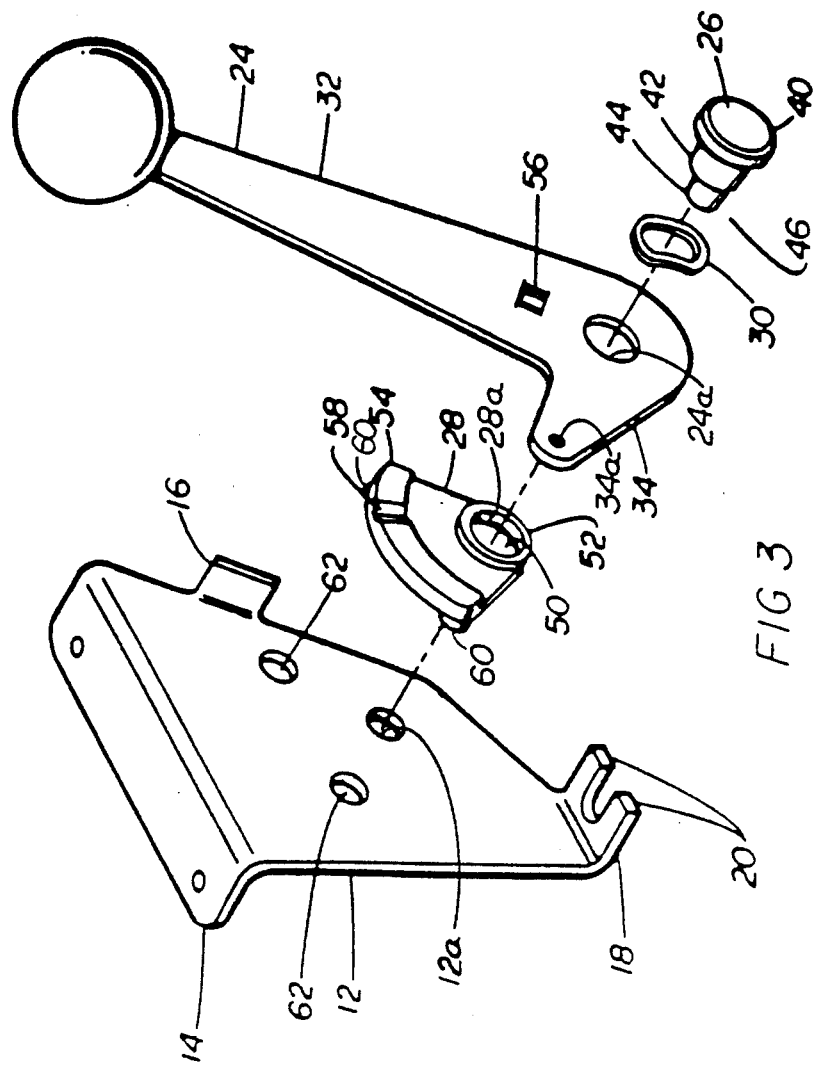
FIG. 3 is an exploded view of the components of the improved the present invention.

Improved throttle control 10 of the present invention, as shown in the drawings, includes the metal bracket 12 having a generally triangular shape as best seen in FIG. 1, mounting flange 14 extending at right angles to the main portion of bracket 12, stop tab 16 which extends at right angles to the main portion of bracket 12 in the opposite direction from flange 14 and throttle cable sheath engaging means 18 which includes the two fingers 20, extending at right angles to bracket 12, which are spaced to tightly engage the end of throttle cable sheath 22. It should be noted that any suitable means may be provided to secure cable sheath 22 to bracket 12, such as, for example, a rolled clip which is integral with the bracket or secured thereto and through which sheath is inserted and thereafter secured therein by staking. Control 10 also includes throttle operating lever 24 which is pivotally connected to bracket 12 by rivet 26, which extends through lever mounting opening 24a, bracket mounting opening 12a and detent pad mounting opening 28a, plastic detent pad 28 which is positioned between lever 24 and bracket 12 and biasing means 30, shown as a spring washer or wave washer, to provide a biasing force urging lever 24 against plastic detent pad 28. Lever 24 includes operating arm 32 and cable arm 34 having opening 34a to which throttle cable 36 is connected providing the lever with cable connecting means. The outer end of operating arm 32 includes a suitable handle or knob 38 to be grasped by the operator when moving lever 24.

As seen in FIGS. 2 and 3, rivet 26 is a shoulder type rivet including head 40, large shank 42, reduced shank 44 with shoulder 46 between the two shanks 42 and 44 and recessed forming end 48. As seen in FIG. 2, the distance from the inner surface of rivet head 40 to shoulder 46 (the length of large shank 42) is preselected so that lever 24, plastic detent pad 28 and biasing means 30 are positioned on that portion of rivet shank 42 so that biasing means 30 exerts the preselected biasing force on lever 24 against plastic detent pad 28.

Figure 4:
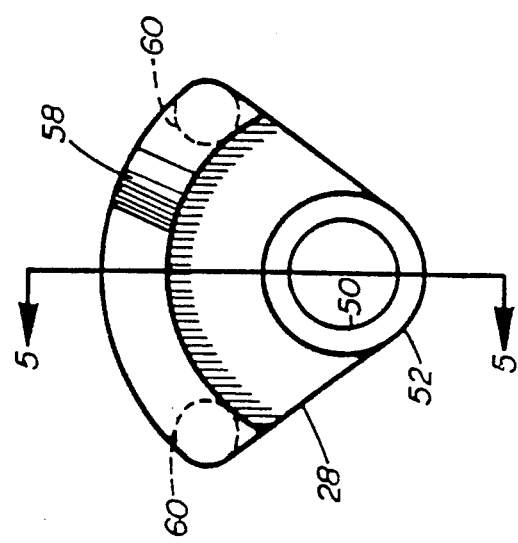
FIG. 4 is an elevation view of the plastic detent pad.
Figure 5:
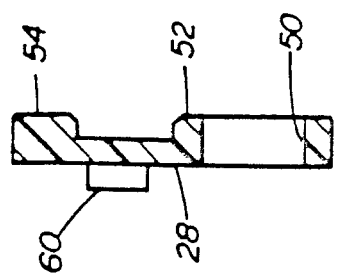
FIG. 5 is a sectional view taken along line 5—5 in FIG. 4.

As shown in FIGS. 3, 4 and 5, plastic detent pad 28 is generally segmentally shaped and includes opening 50 through which rivet 26 extends with annular ridge 52 surrounding opening 50 and in engagement with lever 24 and arcuate ridge 54 on the outer portion of pad 28 and on the side facing lever 24. Lever 24 includes detent 56 projecting from lever 24 and spaced from the pivot axis the same distance as arcuate ridge 54 so that it engages ridge 54 throughout the full range of its movement. Arcuate ridge 54 includes radial groove 58 which when detent 56 on lever 24 is positioned therein defines the desired full throttle position of lever 24. Projections 60 extend from the opposite side of pad 28 and are positioned in openings 62 extending through bracket 12 to assist in the positioning of pad 28 on bracket 12. Projections 60 are sized with respect to opening 62 so that when they are pressed into openings 62 pad 28 will remain in its desired position on bracket 12 unless it is positively removed.

Detent pad 28 is made of a plastic material such as nylon, polytetrafluoroethylene, polypropylene, acetal, or polyethylene and may include suitable fillers, such as mineral fibers, glass fibers and other filler materials which, when embedded in the plastic material, impart to the material of pad 28 the surface characteristics and resistant to environment desired or needed in its application.

Figure 6:
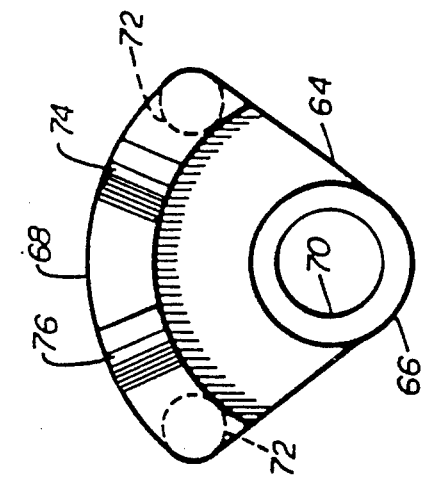
FIG. 6 is an elevation view of a modified plastic detent pad ha more than one preselected throttle positions defined therein.

Plastic detent pad 64, as shown in FIG. 6, is a modified pad in comparison to pad 28 in that it includes all of the components of pad 28 including annular ridge 66, arcuate ridge 68, mounting opening 70 and projections 72 which fit into the openings 62 of bracket 12. The substantial difference in the configuration of pad 64 is that arcuate ridge 68 includes two radial notches or grooves 74 and 76 which represent the full speed engine position of lever 24 and the engine idle speed position of lever 24. Further, it should be noted that there is additional travel available for movement of lever 24 beyond groove 74 to the full choke position and for movement of lever 24 beyond groove 76 to the engine stop position. The end of sheath 22 which extends beyond fingers 20 of sheath engaging means 18 provides a stop for lever 24 at the stop position when cable arm 34 engages the end of sheath 22 and tab 16 provides a stop which operating arm 32 engages at full choke position.

Throttle control levers contemplated generally by the present invention are preferred to have a minimum force of five pounds and a maximum force of fifteen pounds needed to be exerted thereon for movement. Also, in such applications it is desired that there be a suitable means, such as groove 74 shown in FIG. 6, at the full speed throttle position with movement of the throttle control beyond such position being possible to move the throttle to the full choke position. An additional means, such as groove 76 shown in FIG. 6, at an engine idle position is advantageous with additional movement beyond such stop being available to move the throttle control lever to the engine stop position.

Figure 7:
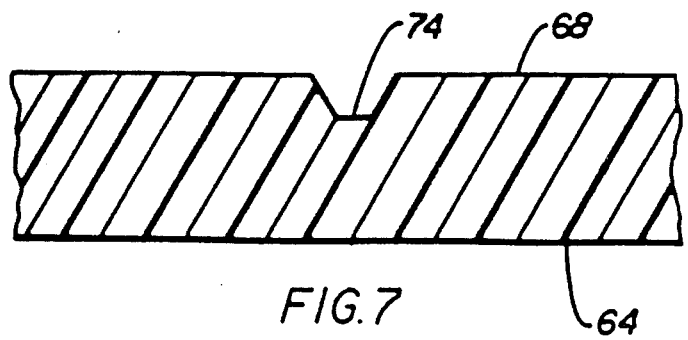
FIG. 7 is a partial view of groove 74 to illustrate its truncated triangular shape.
Figure 8:
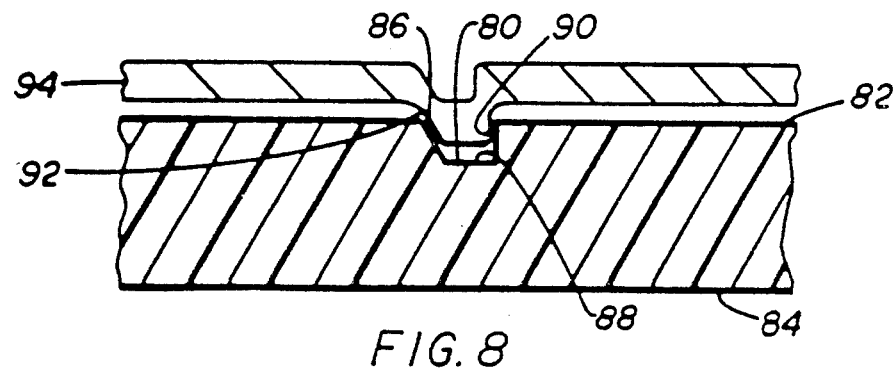
FIG. 8 is a similar view of a modified form of groove.

Another possible feature which is available with the structure of the present invention is to provide recesses or grooves in the arcuate ridge of the detent pad which have shapes other than the truncated V shape shown in the drawings and particularly in FIG. 7. For example, if it is desired to require additional force to move the lever beyond its groove, the shape of the groove is changed as shown in FIG. 8. Groove 80 in arcuate ridge 82 of detent pad 84 includes tapered surface 86, flat bottom portion 88 and vertical wall 90. When lever detent 92 of control lever 94 is engaged within groove 80 as shown, it is relatively easy to move it toward and over tapered surface 86 but in contrast it is relatively hard to move it toward and past vertical wall 90. With wall 90 being vertical and detent having a vertical surface, the movement of lever 94 may require a side loading by the operator to move it past wall 90. Variations of the contour of the grooves in which the lever detent engages for preselected control position can be used to control the force or difficulty required to move the lever beyond such position.

While the drawings illustrate one and two recesses in arcuate ridges 54 and 68, respectively, in some applications, the arcuate ridge may have no recesses. An example of such application is a case in which the lever control is used to control a transmission which has its position locating means included in its mechanism. Such locating means may include two, three or more preselected lever positions which are easily felt by the operator.

The improved lever control of the present invention provides advantages which result from its unique structure. This control provides a means of having the resistance to the movement between the lever and its mounting bracket at a larger radius from the pivot axis of the lever and between a metal lever and a plastic detent pad. This provides the advantages of making the lever resistance of the control substantially the same all of the time and independent of use or abuse by the operator and the vagaries of the environment in which it has to operate. The control also offers the feature that it is simple to change the resistance to the movement of the lever and when changed such resistance is substantially constant. The change can be accomplished by the substitution of a different spring or wave washer. Also, variations of the thickness of the plastic detent pad can increase or decrease the resistance since an increase of the pad thickness causes the lever to have to deflect slightly more than with a thinner pad. The critical factor in determining such force is to control the distance between the shoulders which engage the wave spring and the back side of the bracket. Variation of this distance controls the force exerted by wave spring and thus the force with which lever detent engages the arcuate ridge of the detent pad. Thus, a different type of rivet could be used than a shoulder rivet so long as the distance which determines the preloading of wave spring is controlled to provide the desired resistance to the movement of the control lever.

With the single or multiple notches or positioning recesses in the arcuate ridge on the detent pad, the full speed position and sometimes the idle position of a throttle lever are preset which simplifies the assembly of the throttle control to the engine. An additional advantage of the present invention is that the throttle lever has a positive and quality feel which is sufficiently easy for anyone to operate but has adequate resistance so that the throttle lever does not move when movement is not desired. An additional advantage of the preferred form of the present invention is achieved with the snap on feature of the pad to the bracket so that it is properly positioned during assembly and riveting. An additional advantage of the present invention is that the friction contact area between the lever projection and the detent pad is minimal and acts as a wiper, cleaning foreign material from the detent pad arcuate surface and maintaining the frictional parameters between the detent pad arcuate surface and the lever projection.

While the preferred form of the present invention discloses a lever control having a metal bracket, a metal lever and a detent pad of a plastic material with an arcuate ridge engaged by a projection, it is contemplated that the advantages of the present invention may be obtained by a structure in which only a lever and a bracket are used and either the arcuate surface or the lever projection is of a plastic material and the other is metal. A further modification which is contemplated is that the detent pad may have a uniform thickness without the annular ridge and the arcuate ridge but with such uniform thickness the area immediately surrounding the pivoting mechanism serves as the annular ridge and the surface of the pad which is engaged by the throttle detent serves as the arcuate ridge which may include one, two or multiple recesses or no recesses depending upon its intended application as hereinbefore explained. A further contemplated modification would be to use suitably selected plastic materials, usually expected to be different materials but possibly the same material, for both the bracket and the lever. It is believed to be within the contemplation of the present invention to include and teach structures and to cover such structures which have a mere reversal of parts. Examples of some of the part reversal is that the lever may include a plastic projection while the arcuate surface engaged by the lever projection is a metal surface or a suitable plastic surface coacting with the plastic lever projection to provide the desired resistance to lever movement. The improved throttle control 110 shown in FIG. 9 is identical with throttle control 10 previously described except that bracket 112 does not include the mounting openings 62 for mounting pad 28 thereon but does include recesses 111, 113 and 115 which provide the stop, normal and full choke positions for lever 124. Projection 156 on lever 124 is position to engage bracket 112 in the arcuate area 112a on its surface so that projection 156 will come into engagement with recesses 111, 113 and 115 as it is pivoted about its mounting opening 124a. Additionally, plastic detent pad is not included in this form of the invention as projection 156 may be provided with plastic insert 156a which engages arcuate area 112a so that there is no metal-to-metal engagement between lever projection 156 and arcuate bracket area 112a. This structure provides a suitable structure which does not have the disadvantages of the prior art devices and which provides the biasing of the lever 24 against the bracket area 112a so that there are preselected operating positions such as mentioned.

What is claimed is:

1. An engine throttle control comprising a metal bracket having a first mounting opening, a metal throttle lever including a second mounting opening and means for connecting to a throttle cable, a plastic detent pad having a third mounting opening with an annular ridge surrounding the third opening and an arcuate ridge spaced radially outward from said annular ridge, means extending through said first, second and third mounting openings in said bracket, said lever and said pad to secure said lever and said pad to said bracket with said pad positioned between said lever and said bracket, and means biasing said lever toward said pad, said lever having a detent projecting toward said pad to engage said arcuate ridge, said arcuate ridge having a first recess to receive said lever detent to define a preselected position of said lever.

2. A control according to claim 1 wherein the material of said pad is selected from the group of plastic materials consisting of nylon, polytetrafluoroethylene, acetal, polyethylene and propylene.

3. A control according to claim 1 wherein said bracket includes a pair of location openings, and said pad includes a pair of projections adapted to snap into said location openings in said bracket to position said pad on said bracket in its desired position.

4. A control according to claim 1 wherein said arcuate ridge of said detent pad includes a second recess in addition to said first recess to receive said lever detent to define the idle speed position of said lever.

5. A control according to claim 1 wherein said biasing means includes a spring washer.

6. A control according to claim 5 wherein said securing means is a shouldered rivet.

7. A control according to claim 6 wherein said rivet includes a head, an enlarged shank portion extending from the inside of said rivet head to said shoulder and the thickness of said pad, said lever and the normal biasing space of said spring washer so that the force require to move said lever is between 5 and 15 pounds.

8. A control according to claim 2 wherein said material is selected to withstand the environment to which it is to be exposed without appreciably changing the friction resulting from the engagement of said arcuate ridge by said lever detent as said lever is moved.

9. An engine throttle control comprising a metal bracket having a first mounting opening, a metal throttle lever including a second mounting opening and means for connecting to a throttle cable, a plastic detent pad having a third mounting opening with an annular ridge surrounding the third opening and an arcuate ridge spaced radially outward from said annular ridge, means extending through said first, second and third mounting openings in said bracket, said lever and said pad to secure said lever and said pad to said bracket with said pad positioned between said lever and said bracket, and means biasing said lever toward said pad, said lever having a detent projecting toward said pad, said arcuate ridge having a first recess to receive said lever detent to define a first preselected position of said lever, said arcuate ridge of said detent pad includes a second recess in addition to said first recess to receive said lever detent to define a second preselected position of said lever, said arcuate ridge extends beyond both of said first and said second recesses to maintain engagement with said lever detent when it is moved to full choke position and when it is moved to engine stop position.

10. A control according to claim 1 wherein said arcuate ridge recess has a transverse truncated triangular shape.

11. A control according to claim 1 wherein said arcuate ridge recess has a transverse shape of one tapered wall, a flat bottom portion and a second vertical wall.

12. A lever type control comprising a metal bracket having a first mounting opening, a metal lever including a second mounting opening and means for connecting to a control cable, a plastic detent pad having a third mounting opening with an arcuate surface spaced radially outward from said third mounting opening, means extending through said first, second and third mounting openings in said bracket, said lever and said pad to secure said lever and said pad to said bracket with said pad positioned between said lever and said bracket, and means biasing said lever toward said pad, said lever having a detent projecting toward said pad and being positioned to engage said arcuate surface on said pad during pivoting movement of said lever with respect to said pad and said bracket.

13. A lever control comprising a bracket having a mounting opening and a surface spaced radially outward from the mounting opening, a lever including a mounting opening, means for connecting to a cable and a projection, means extending through said bracket and said lever mounting openings to pivotally mount said lever to said bracket with said lever projection positioned to engage said surface on said bracket as said lever is moved about said pivotal mounting means, and means biasing said lever toward said bracket, said surface on said bracket having at least one recess to receive said lever projection to define a preselected position of said lever, at least one of said surfaces on said bracket and said projection include a plastic surface for engaging the other of said surfaces wherein said surface on said bracket is provided by a plastic detent pad secured to said bracket and having an arcuate surface with at least one recess to receive said lever projection.

* * * * *